United States Patent [19]

Castelaz

[11] Patent Number: 4,920,506

[45] Date of Patent: Apr. 24, 1990

[54] ULTRA-HIGH SPEED TWO-DIMENSIONAL COORDINATE TRANSFORM PROCESSOR

[75] Inventor: Patrick F. Castelaz, Yorba Linda, Calif.

[73] Assignee: Hughes Aircraft Company, Los Angeles, Calif.

[21] Appl. No.: 255,083

[22] Filed: Oct. 7, 1988

[51] Int. Cl.$^5$ .......................... G06J 1/00; G06G 7/22
[52] U.S. Cl. .................................. 364/602; 364/604; 364/815
[58] Field of Search ............... 364/600, 602, 604, 815; 340/607

[56] References Cited

U.S. PATENT DOCUMENTS

| | | | |
|---|---|---|---|
| 3,950,733 | 4/1976 | Cooper et al. | 340/172.5 |
| 4,254,474 | 3/1981 | Cooper et al. | 364/900 |
| 4,326,259 | 4/1982 | Cooper et al. | 364/715 |
| 4,450,530 | 5/1984 | Llinas et al. | 364/513 |
| 4,591,980 | 5/1986 | Huberman et al. | 364/200 |

OTHER PUBLICATIONS

Lippman, Richard P. —"An Introduction to Computing with Neural Nets", IEEE ASSP MAG. 4/87.

Primary Examiner—Jerry Smith
Assistant Examiner—Stephen M. Baker
Attorney, Agent, or Firm—W. K. Denson-Low

[57] ABSTRACT

An ultra-high speed two-dimensional coordinate transform processor (10) contains layers having conducting lines representing coordinate lines in coordinate systems. Layers in a first set have conducting lines representing a first coordinate system. Layers in a second set have conducting lines representing a second coordinate system and are positioned adjacent the layers in the first set. A signal is applied at a point where lines in the first set intersect. This point represents a point in the first coordinate system. An induced signal is sensed in the layers in the second set at a point where coordinate lines intersect. Since the detected signal will be strongest at the point nearest the applied signal, the intersecting point having the strongest signal will represent the point in the second coordinate system that is the transform of the first point. The processor (10) is faster than conventional coordinate transform methods and is inexpensive to produce. Accuracy may be increased by repeating the processing in a smaller coordinate space.

19 Claims, 4 Drawing Sheets

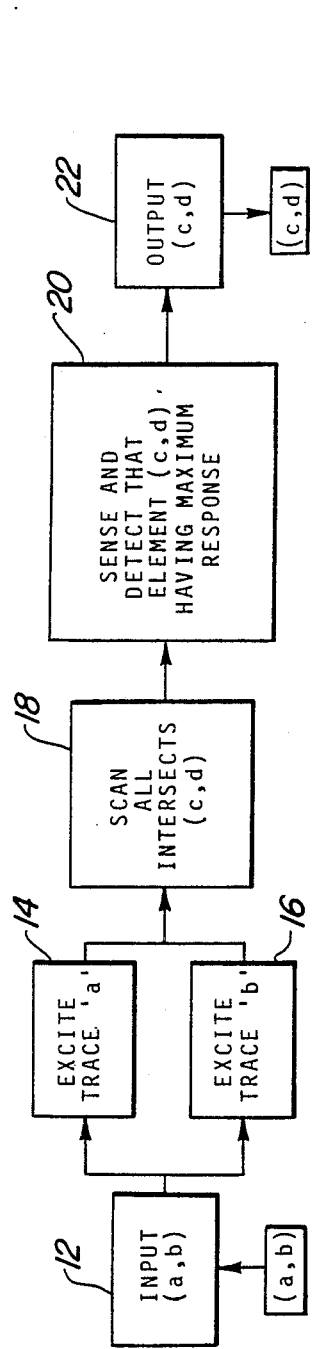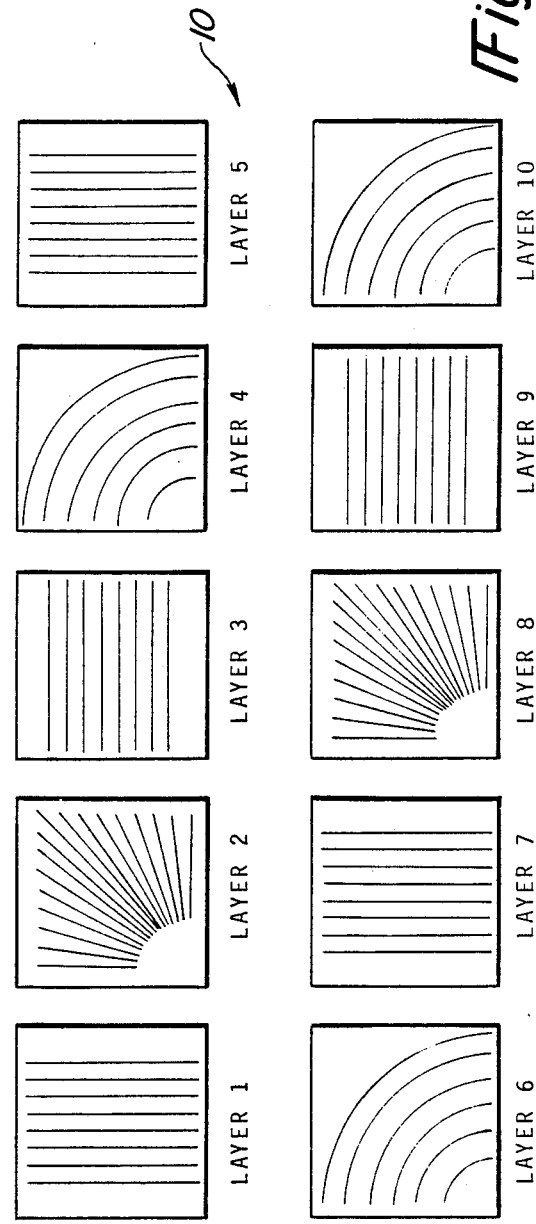
Fig-3
Fig-4

ULTRA-HIGH SPEED TWO-DIMENSIONAL COORDINATE TRANSFORM PROCESSOR

BACKGROUND OF THE INVENTION

1. Technical field

This invention relates to information processors, and more particularly to high speed coordinate transform processors utilizing associative coupling between adjacent conductive layers.

2. Discussion

Coordinate systems are schemes for locating points in a given space by means of numerical quantities specified with respect to some frame of reference. Common coordinate systems include the Cartesian coordinate system, the Polar coordinate system, the Spherical coordinate system and the Cylindrical coordinate system. Information in one coordinate system may be transformed to another coordinate system by means of a system of equations which express each point in one coordinate system as some function of the point in the other coordinate system. Such transformations, for example, from cartesian coordinates to polar coordinates, are required in a number of applications.

Prior approaches to performing rapid coordinate transformations have typically involved solving the transformation equations in software on general purpose computers. A drawback to software approaches is that they are not fast enough for some real-time or near real-time problems. This is because of the time required to solve the transformation equations. An alternative to software apporaches is to use a hard-wired implementation of the CORDIC algorithm to perform coordinate transformations. This provides an improvement in speed over software solutions but still requires on the order of microseconds to perform a coordinate transform. Further, the hardwired CORDIC algorithm approach is limited to trigonometric and transcendental transforms. Consequently, it cannot perform extremely fast linear and/or non-linear bi-directional transformation of two-dimensional coordinate vectors. Other approaches, such as those used in digital scan converters, use a significant number of active RAM components in a memory lookup table technique for coordinate conversion. These devices have the drawback of being relatively expensive and bulky because of the large number of RAM components required. Also, such systems still do not achieve adequate speeds for some applications.

Accordingly, it would be desirable to provide a processor capable of performing coordinate transformations at higher speeds than currently available processors. It is also desirable to provide a processor that avoids the necessity of solving transformation equations in performing coordinate transforms, to thereby achieve faster processing speeds. It would also be desirable to provide a cordinate transform processor that is inexpensive and compact so that its processing capabilities can be replicated a number of times in a relatively small space for relatively little cost.

SUMMARY OF THE INVENTION

Pursuant to the present invention, a coordinate transform processor is provided that can rapidly solve coordinate transformations. The invention consists of a multi-layer substrate each layer having geometric patterns that conduct signals. The geometric patterns are an analogue of the coordinate systems being transformed. The transformation of an input vector to an output vector is performed by interactive coupling among the substrate layers as a function of the geometric pattern on adjacent layers.

In particular, a first set of layers having a geometric pattern corresponding to coordinate lines in a first coordinate system is positioned between successive layers in a second set having geometric patterns corresponding to coordinate lines in a second coordinate system. A signal is then applied to the lines in the first set of layers which intersect at a point that represents a point in the first coordinate system. This signal is coupled to adjacent layers in the second set. The coupled signal is then sensed and the intersecting point in the second set of layers that is nearest the point where the signal was introduced in the first set of layers is determined. This determination may be made by comparing the induced signal strength at intersecting points in the second set of layers and choosing the intersecting point having the strongest induced signal. The chosen point in the second set of layers represents the point in the second coordinate system that is the transformation of the equivalent point in the first coordinate system. The above process may be reversed to transform a point in the second coordinate system into a point in the first coordinate system. The above process may be reversed to transform a point in the second coordinate system into a point in the first coordinate system. The resulting coordinate transform processor performs extremely fast transformations, is inexpensive to produce, and may be replicated n-times to multiply the capability n-fold.

BRIEF DESCRIPTION OF THE DRAWINGS

The various advantages of the present invention will become apparent to one skilled in the art by reading the following specification and by reference to the following drawings in which:

FIG. 3 is a flowchart showing the processing of a coordinate transform processor in accordance with the present invention.

FIG. 4 is a diagram of the various substrate layers showing the conductive lines in accordance with the present invention.

DESCRIPTION OF THE PREFERRED EMBODIMENTS

Figure 1:
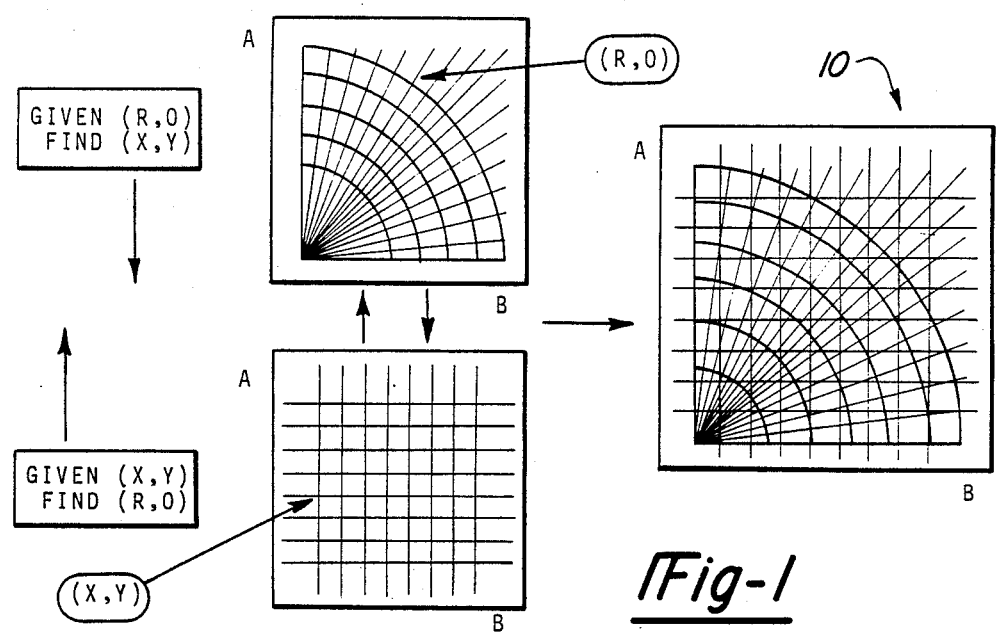
FIG. 1 is a diagrammatic description of the coordinate transform problem and the concept of the present invention for the (R, $\theta$) to (X, Y) case.

Referring to FIG. 1, a description of the coordinate transform problem is shown for the case of transformation between polar and cartesian coordinates. In particular, FIG. 1 shows a point (R, $\theta$) in a two-dimensional space A X B represented by polar coordinates. A is the maximum distance in the Y direction and B is the maximum in the X direction. R represents the range or distance from the lower left most point. $\theta$ represents the angle from a starting reference point on a 360° circle.

The problem is to find the point (x,y) in cartesian coordinates that corresponds to the point (R, θ). Alternatively, a given point (x,y) shown in a two-dimensional space A X B represented by cartesian coordinates, may be transformed to a point on polar coordinates (R,θ).

One way of viewing the problem is to superimpose the polar coordinates on top of the cartesian coordinates in a coordinate transform processor 10, as shown in the right side of FIG. 1. The resulting space A X B represents the entire space of the resulting superimposed coordinates, and is equal to the space A X B covered by the polar and cartesian coordinates. To perform coordinate transformations without using transformation equations, the concept, in accordance with the present invention, is to excite a point (R,θ) and to detect the signal induced at the nearest superimposed (x,y). That (x,y) will then represent the transform of the (R,θ) point. Alternativley, a point (x,y) may be excited and the induced signal at the nearest (R,θ) will be the transform of the (x,y) point.

Figure 2:
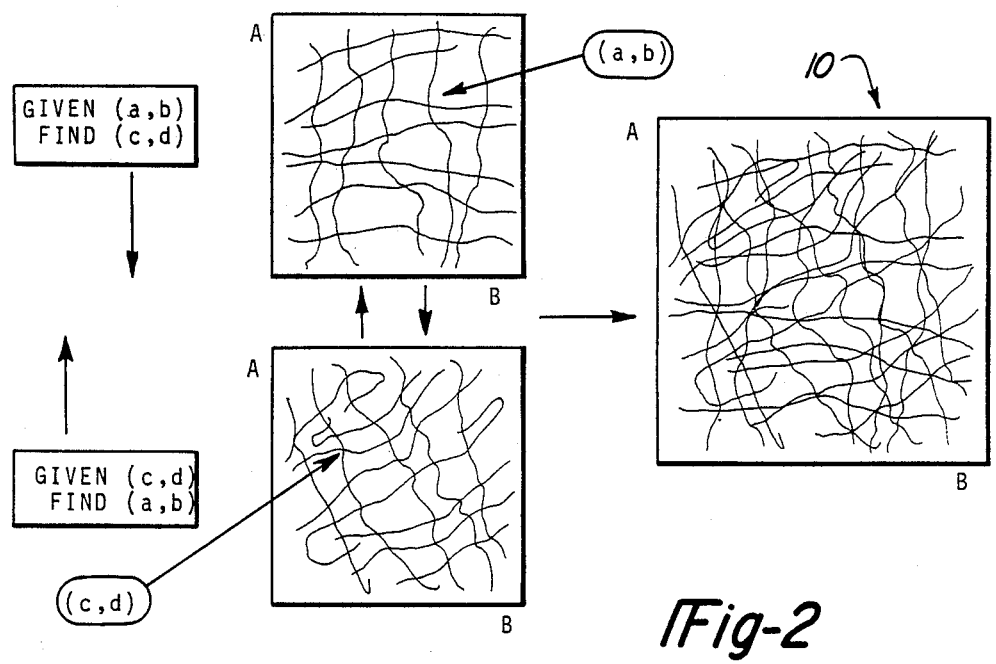
FIG. 2 is a description of the coordinate transform problem and the concept of the present invention for the arbitrary transform case.

Similarly, FIG. 2 shows the transform problem for the case of an arbitrary space. In particular, a given point (a,b) is shown in space A X B in a first coordinate system. It is desired to find the corresponding point (c,d) in a second coordinate system representing the same space A X B. Alternatively, given point (c,d) in a second coordinate system, the problem is to find the corresponding point (a,b) in the first coordinate system. As shown in FIG. 2, the first and second arbitrary coordinate systems can be superimposed on each other in the same A X B space in the coordinate transform processor 10. A signal exciting a point on the first coordinate system will induce a signal in the second system. This induced signal will be strongest at the point which represents the transformation of the excited point in the first coordinate system.

Referring now to FIG. 3, there is shown a flowchart for the control/processing algorithm in accordance with the preferred embodiment of the present invention. This algorithm accomplishes the transformation of a point (a,b) on a first coordinate system into point (c,d) on a second coordinate system. Initially, the coordinate transform processor 10 accepts as input the coordinates (a,b). This input may be, for example, a digital representation (to any arbitrary accuracy) of coordinates (a,b). (Step 12) The line in the first coordinate system representing "a" is then excited. (Step 14) This line may be a conductive trace, and the excitation may be by means of an applied electrical signal, as will be explained in more detail below. At approximately the same time, the "b" line is also excited. (Step 16) Next, a sensor scans all (c,d) intersects in the second coordinate system. (Step 18) This may be done, for examle, by measuring voltage or current in each (c,d) trace either serially or in parallel. The (c,d) intersect having the maximum response is then identified. (Step 20) This identification may be accomplished by using a sensor threshold. Moreover, the threshold may be adaptive to further increase the speed of the coordinate transform processor 10. This maximum (c,d) intersect is then provided as output from the coordinate transform processor 10. (Step 22) This output may be, for example, a digital representation (to arbitrary accuracy) of coordinates (c,d).

It is important to note that resolution to any desired degree of accuracy may be obtained by re-processing a given input coordinate having a known resolution, in successively smaller scales. In this way, a smaller and smaller space will be covered with each repetition. Thus, the accuracy of the output is only limited by the accuracy of the input.

In FIG. 4 there is shown a substrate layout for a first embodiment of the coordinate transform processor 10 in accordance with the present invention. The coordinate transform processor 10 is composed of ten layers. Each layer has signal conducting patches that follow a prescribed geometric pattern. These conducting patches may comprise copper conductors on a printed circuit substrate. In layers one, five and seven, are the X lines, and in layers three and nine are the Y lines of the X-Y coordinate system. In layers two and eight are the θ lines, and in layers four, six and ten are the R lines in the R-θ coordinate system. Each layer is arbitrarily thin and is separated from all adjacent layers by an arbitrarily thin dielectric. It is preferred that at least one layer of each type of trace in one coordinate system be sandwiched between two different types of layers in the other coordinate system. Layers of the same pattern are repeated in order to insure maximum coupling among all the traces. It may be desirable to cover the coordinate transform processor 10 above and/or below by a ground plane to shield the processor 10 from unwanted electromagnetic interference.

Figure 5:
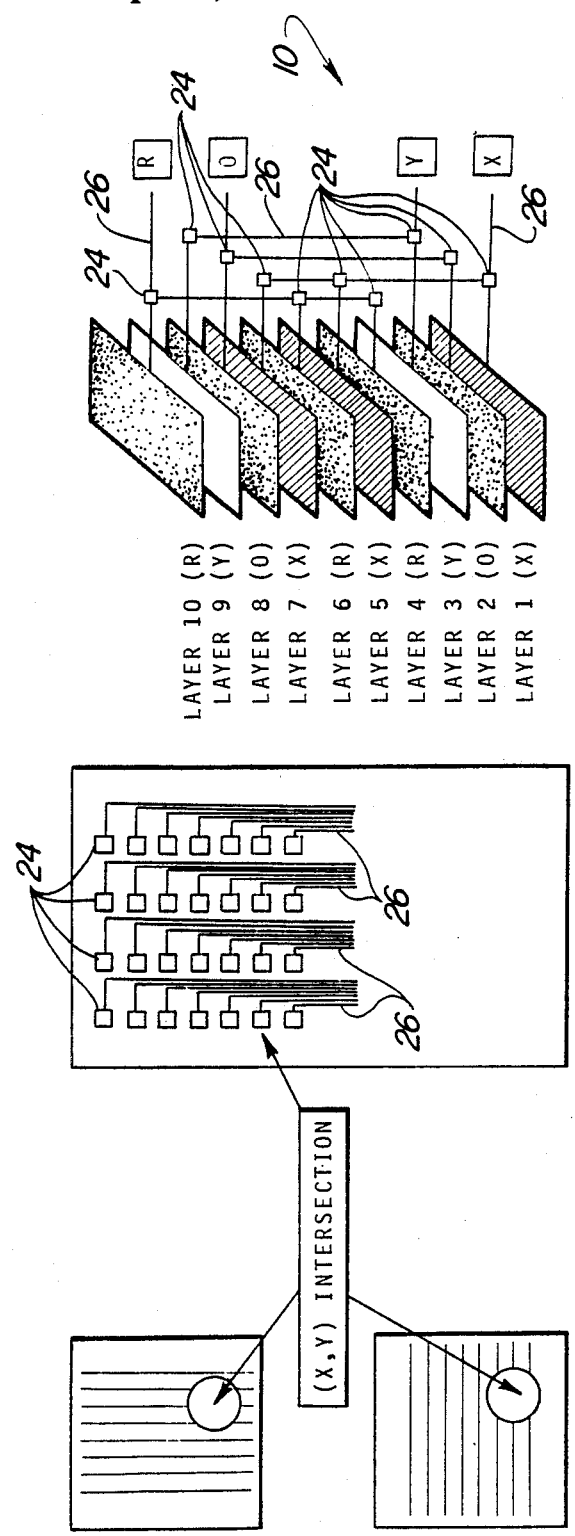
FIG. 5 is a drawing of conductive pads in the preferred embodiment of the present invention.

In FIG. 5 there is shown a second embodiment of the coordinate transform processor 10 in accordance with the present invention. The second embodiment differs from the first by the use of conductive pads 24 at each (x,y) intersection and at each (r, θ) intersection along each trace line. Thus, in this embodiment, it is the array of conductive patches which follows the prescribed geometric patterns shown in FIG. 4 rather than continuous conductive lines. The first embodiment is less expensive because the separate conductive pads 24 are not used, but may require more sensitive sensor circuitry. In the second embodiment the conductive pads 24 provide improved coupling between layers. It should be noted that in the left side of FIG. 5 only the (x,y) geometric pattern of condutive pads 24 is shown. Conductive pads 24 for the (r,θ) lines are not shown. In addition, each conductive pad 24 is independently accessible through independent access lines 26. On the right side of FIG. 5 the ten layers of the coordinate transform processor 10 are shown. The access lines 26 connecting each conductive pad 24 are also shown. However, the bundle of individual access lines shown on the left of FIG. 5 are represented by single lines 26 on the right of FIG. 5. Additional layers which may be required for access lines are also not shown.

Figure 6:
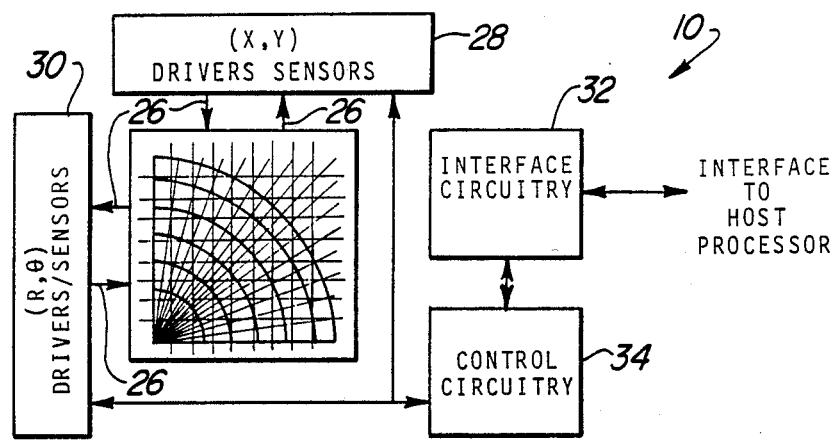
FIG. 6 is a drawing of a board layout of a coordinate transform processor in accordance with the present invention.

In FIG. 6 the functional description of the total board layout of the coordinate transform processor 10 is shown. X-Y drivers/sensor 28 are connected to the traces in the X-Y layers in the first embodiment or to each individual conductive pad 24 in the second embodiment, through access lines 26. Similarly R-θ drivers/sensors 30 are connected to the traces or to the conductive pads 24 in the (r-θ) layers through access lines 26. Both the driers/sensors 28, 30 perform the function of exciting the traces. This step is shown as steps 14 and 16 in FIG. 3. The drivers/sensors 28, 30 also perform the function of scanning and detecting the intersect with the maximum response as described in steps 18 and 20 in FIG. 3.

Overall, the processing performed by the coordinate transform processor 10 is as follows. The initial input indicating the point (a,b) in the first coordinate system is fed to the coordinate transform processor 10 by a host processor (not shown) to an interface circuit 32, shown in FIG. 6. This information (a,b) is then fed from the interface circuit 32 to a control circuit 34. The control circuit 34 directs the (a,b) signal to the appropriate driver/sensor, which may be the X-Y driver/sensor 28 or the R-θ driver/sensor 30. The driver/sensor then excites the traces, or pads 24, corresponding to the point (a,b).

The above processing may be accomplished in a number of ways using a combination of the control circuit 34 and the drivers/sensors 28, 30. For example, the processing may be in the amplitude domain where single pulses are appropriately timed and sensed via threshold levels to direct a signal to the appropriate trace. Alternatively, the processing may be in the frequency domain where signals of appropriate frequency content are used and localized combinations sensed using the appropriate filters. Once the (a,b) traces are excited by, for example, the X-Y drivers/sensors 28, the R-θ drivers/sensors 30 will scan and sense the (r,θ) intersection having the maximum response. This response will be caused by coupling of the signal from the (x,y) intersection to the nearest (r,θ) intersection. For example, in the preferred embodiments, where there are electrical signals passing through the traces, there may be capacitive coupling between the adjacent layers. It should be noted, however, that other means of coupling are possible such as magnetic or optical coupling between successive layers. For example, in an optical embodiment, some or all of the functions of the coordinate transform processor 10 may be implemented with optical components. Whatever the mode of coupling, it is an important characteristic of the couplig that the speed of coupling be fast, and the coupling strength decrease with the distance away from the excited intersection (a,b). In this way, one intersection (c,d), that is closest to (a,b) will have a stronger induced signal than any other (c.d) point.

The signal induced in the (r,θ) intersection will then be detected by the R-θ driver/sensor 30. As described above, this sensing may be in either the amplitude or the frequency domain. It should be noted that the support circuits, specifically the drivers/sensors 28, 30, the control circuit 34, and the interface circuit 32, need not reside on the same circuit board as the ten layers containing the traces.

It will be appreciated that the coordinate transform processor 10 described above is inexpensive to produce using conventional printed circuit board technology. Also, it requires only simple support circuitry. Moreover, it performs coordinate transformations at extremely fast speeds. In the amplitude processing domain, for example, one nanosecond pulses may be used to perform one billion (X,Y)-to-(R,θ) or (R,θ)-to-(X,Y) coordinate transformations per second. This is at least three orders of magnitude faster than available coordinate transformation processors known to the inventor. Even higher speeds are obtainable, limited only by support circuitry and millimeter wave effects in the multilayer printed circuit substrate itself. Resolution of the coordinates is arbitrarily fine and is limted only by the printed circuit substrate or equivalent manufacturing technology. Those skilled in the art can appreciate that other advantages can be obtained from the use of this invention and that modifications can be made without departing from the true spirit of the invention after studying the specifications, drawings, and following claims.

What is claimed is:

1. IN a processor for performing coordinate transformations the improvement comprising:
    a first set of layers of planar members each having signal conducting lines representing coordinate lines in a first coordinate system;
    a second set of layers of planar members each having signal conducting lines representing coordinate lines in a second coordinate system;
    layers in said first set being positioned adjacent to said layers in the second set so that each layer in said first set is positioned between successive layers in said second set;
    means for applying a signal to selected ones of said signal conducting lines in said first set of layers, said selected lines intersecting at a point that represents a point in said first coordinate system;
    means for detecting a signal in lines in said second set of layers, said signal being induced by said signal applied at said first intersection in said first set of layers; and
    means for comparing said detected signal at various intersecting points in said second set of layers, wherein the intersecting point that is nearest said first intersecting point in said first set of layers can be determined by the strength of the detected signal.

2. The processor of claim 1 wherein said signal conducting lines are electrically conductive and said signal is an electrical signal.

3. The processor of claim 2 wherein said applied electrical signal is induced in said signal conducting lines in said second set of layers by means of capacitive coupling.

4. The processor of claim 1 wherein said first and second coordinate systems comprise two-dimensional Cartesian and Polar coordinate systems.

5. The processor of claim 1 wherein said means for applying a signal and said means for detecting a signal both further comprise a plurality of layers of conductive pads positioned adjacent to each of said layers from said first and second set, each of said conductive pads each being located adjacent to one of said intersections of said lines.

6. The processor of claim 1 wherein said means for applying a signal to selected ones of coordinate lines further comprises;
    means for producing a signal having a selected amplitude; and
    means for directing said signal to selected ones of said lines according to the amplitude of said signal.

7. The processor of claim 1 wherein said means for applying a signal to selected ones of coordinate lines further comprises;
    means for producing a signal having a selected frequency; and
    means for directing said signal to selected ones of said lines according to the frequency of said signal.

8. The processor of claim 1 wherein each of said layers is separated by adjacent layers of a dielectric material.

9. The processor of claim 1 wherein said layers comprise (X,Y) and (R,θ) coordinate lines in said coordinate systems and said layers are arranged so that the first layer contains said X lines, the second layer contains said θ lines, the third layer contains said Y lines, the fourth layer contains said R lines, the fifth layer contains said X lines, the sixth layer contains said R lines, the seventh layer contains said X lines, the eighth layer contains said θ lines, the ninth layer contains said Y lines and the tenth layer contains said R lines.

10. A processor for performing coordinate transformations comprising;
- a first set of layers of planar members each having signal conducting lines representing coordinate lines in a first coordinate system;
- a second set of layers of planar members each having signal conducting lines representing coordinate lines in a second coordinate system;
- layers in said first set being positioned adjacent to said layers in the second set so that each layer in said first set is positioned between successive layers in said second set;
- means for applying a signal to selected ones of said signal conducting lines in said first set of layers, said selected lines intersecting at a point that represents a point in said first coordinate system;
- means for detecting a signal in lines in said second set of layers, said signal being induced by said signal applied at said first intersection in said first set of layers; and
- means for comparing said detected signal at various intersecting points in said second set of layers, wherein the intersecting point that is nearest said first intersecting point in said first set of layers can be determined by the strength of the detected signal.

11. The processor of claim 10 wherein said signal conducting lines are electrically conductive and said signal is an electrical signal.

12. The processor of claim 11 wherein said applied electrical signal is induced in said signal conducting lines in said second set of layers by means of capacitive coupling.

13. The processor of claim 10 wherein said first and second coordinate systems comprise two-dimensional Cartesian and Polar coordinate systems.

14. The processor of claim 10 wherein said means for applying a signal and said means for detecting a signal both further comprise a plurality of layers of conductive pads positioned adjacent to each of said layers form said first and second set, each of said conductive pads each being located adjacent to one of said intersections of said lines.

15. The processor of claim 10 wherein said means for applying a signal to selected ones of coordinate lines further comprises;
- means for producing a signal having a selected amplitude; and
- means for directing said signal to selected ones of said lines according to the amplitude of said signal.

16. The processor of claim 10 wherein said means for applying a signal to selected ones of coordinate lines further comprises;
- means for producing a signal having a selected frequency; and
- means for directing said signal to selected ones of said lines according to the frequency of said signal.

17. The processor of claim 10 wherein each of said layers is separated by adjacent layers of a dielectric material.

18. The processor of claim 10 wherein said layers comprise (X,Y) and (R,θ) coordinate lines in said coordinate systems and said layers are arranged so that the first layer contains said X lines, the second layer contains said θ lines, the third layer contains said Y lines, the fourth layer contains said R lines, the fifth layer contains said X lines, the sixth layer contains said R lines, the seventh layer contains said X lines, the eighth layer contains said θ lines, the ninth layer contains said Y lines and the tenth layer contains said R lines.

19. A method for transforming data from one coordinate system to another, said method comprising:
- positioning layers of planar members so that a first set of layers of planar members are adjacent to alyers in a second set of planar members and each layer of said first set is positioned between successive layers from the second set, said first set of layers having signal conducting lines representing coordinate lines in a first coordinate system and said second set of layers having signal conductive lines representing coordinate lines in a second coordinate system;
- applying a signal to selected lines in said first set of layers, said selected lines intersecting at a point that represents a point in said first coordinate system;
- detecting a signal in said conductive lines in said second set of layers, said signal being induced by said signal applied to said adjacent conductive lines in said first set of layers; and
- comparing said detected signal at various intersecting points in said second set of layers wherein the intersecting point that is nearest said first intersecting point in said first coordinate system can be determined by the strength of the detected signal.

* * * * *